March 9, 1943.  L. R. WILLIAMSON  2,313,187
CLUTCH AND BRAKE SYSTEM
Filed April 1, 1939  3 Sheets-Sheet 1
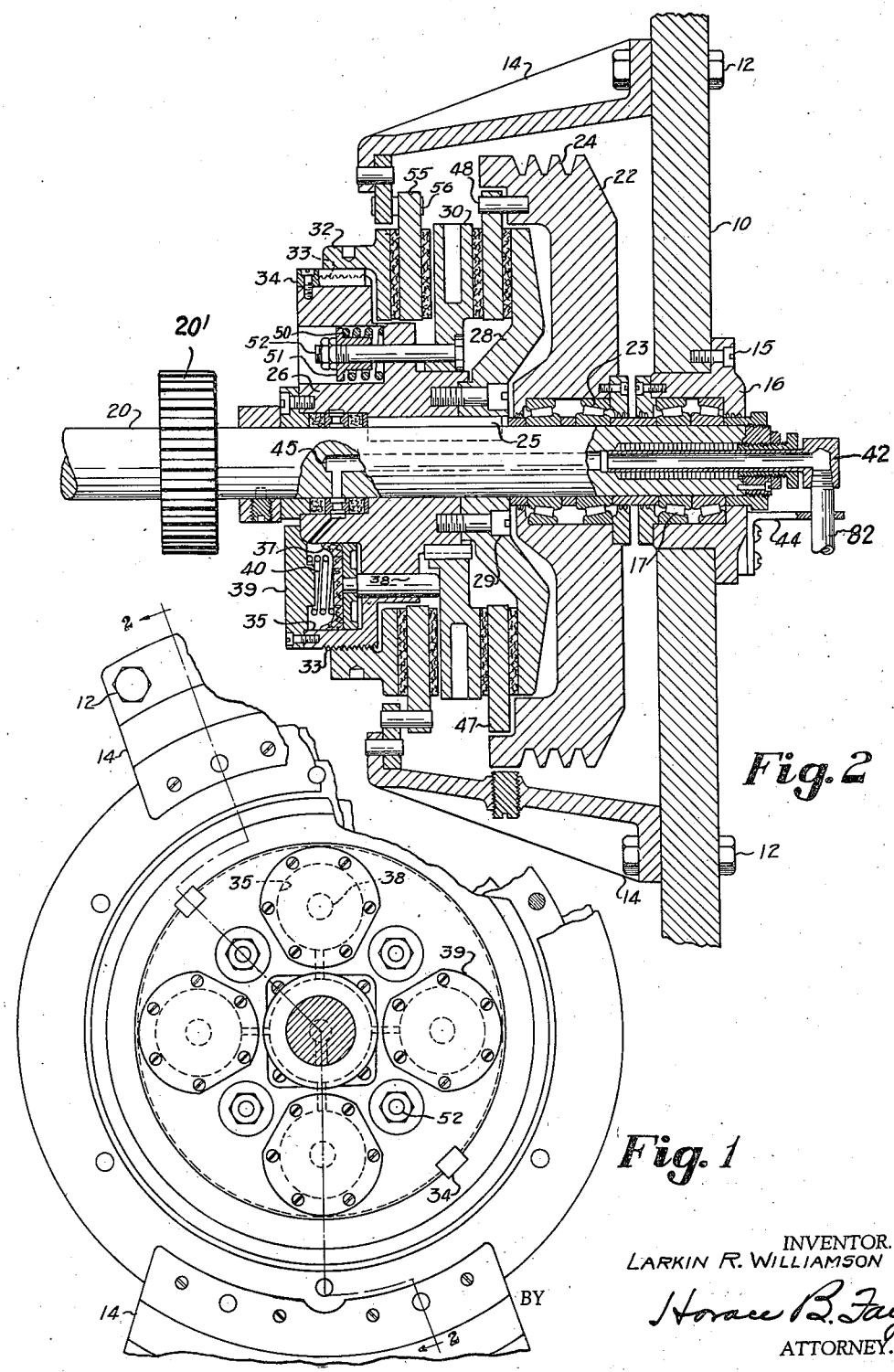
INVENTOR.
LARKIN R. WILLIAMSON
BY Horace B. Fay
ATTORNEY.

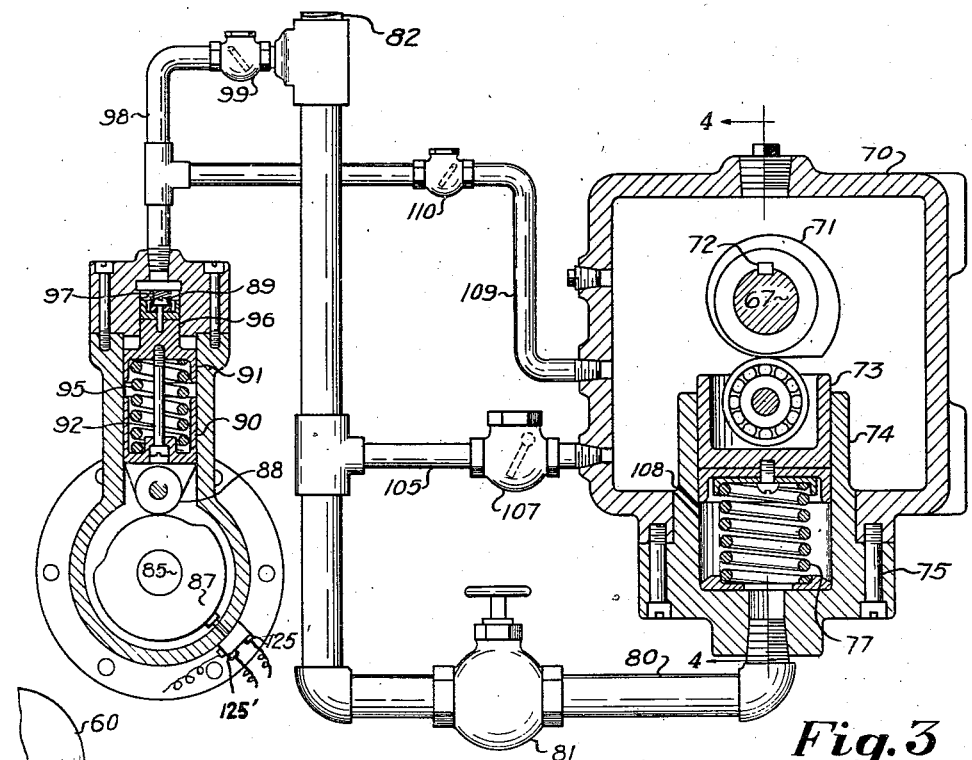
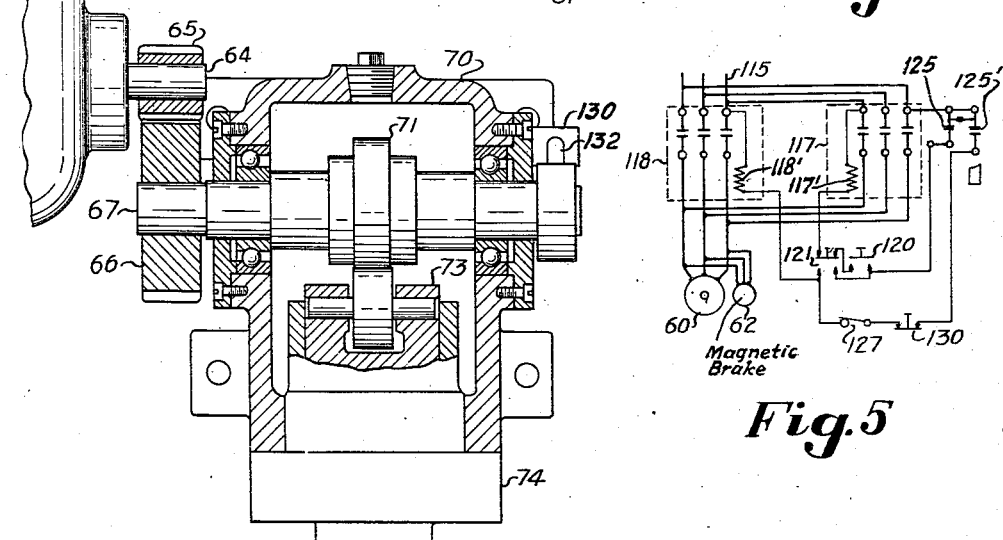

Patented Mar. 9, 1943

2,313,187

UNITED STATES PATENT OFFICE 2,313,187

CLUTCH AND BRAKE SYSTEM

Larkin R. Williamson, Brooklyn, N. Y., assignor to E. W. Bliss Company, Brooklyn, N. Y., a corporation of Delaware Application April 1, 1939, Serial No. 265,474

11 Claims. (Cl. 192—18)

This invention relates to a clutch and a fluid-operated system therefor to engage a driving and driven member and establish a drive from a power means. The invention is more particularly concerned with a clutch and brake and a fluid system to control the same, together with energizing mechanism to control the application of pressure to the system.

Fluid engaging systems for controlling clutches and brakes or combinations of the two are old and very well established, but have been subject to certain disadvantages which my invention eliminates. With systems of this type previously used, pumps of well-known construction were employed to establish the requisite fluid pressure. These pumps were relatively costly and subject to several objections, such as liability to leakage and the like. It has also been difficult to create and maintain the desired pressure on the engaged parts to sustain a uniform drive during the interval desired.

The general object of my invention has been to provide a positive system for controlling the operation of a clutch or the like and to apply a predetermined pressure and to maintain that pressure during the desired interval. An additional object of my invention has been to provide a system by which pressure applied is built up in two stages, the first stage acting to begin the operation of the machine and the second stage acting to supplement the first during the work stroke of the device controlled thereby. Other objects of the invention will become apparent from the following description and from the drawings.

In general I have provided a torque motor and a brake therefor as the power means for applying pressure to the fluid system. The operation of a torque motor is known and may be briefly described as acting to drive the driven member from the motor until a predetermined load is picked up. At this time the motor will stall and remain stalled while holding the load. Such a motor is characterized by a winding with a much higher resistance than is provided in ordinary motors. In conjunction with this motor I provide a brake, preferably of the magnetic type. When the motor is energized for rotation the brake is inactive, but at the instant the motor is deenergized the brake is also deenergized and becomes engaged to hold the motor shaft in the position attained. The brake remains effective until it is released and maintains the fluid pressure in the system even though the motor is inactive.

Torque motors combined with magnetic brakes to function as above described are old and well known in the art as exemplified in Patents 1,238,313; 1,407,207 and 766,117 so that further description is believed to be unnecessary. It may be said, however, that the brake is normally biased to applied position but so long as the motor winding is energized the brake is held in released or unapplied position and that upon deenergizing the motor the springs apply the brake.

The system energized by the motor and brake unit is adapted to apply pressure to the clutch in two stages. The first stage is effected by the motor and its magnetic brake to begin the operation of the machine controlled through the unit. Thereafter the second stage of fluid pressure is applied, preferably through mechanism actuated by the movement of the machine set up by the first stage of pressure. This second pressure becomes effective prior to the work performing part of the machine movement and thus augments the initial pressure.

My system is preferably employed in connection with a combined clutch and brake unit and is employed to govern engagement and releasing of both the clutch and brake. Loaded springs, as hereafter described, function when the pressure is relieved in the system to release the clutch to apply the brake.

To the accomplishment of the foregoing and related ends, said invention, then, consists of the means hereinafter fully described and particularly pointed out in the claims; the annexed drawings and the following description setting forth in detail certain mechanism embodying the invention, such disclosed means constituting, however, but one of various mechanical forms in which the principle of the invention may be used.

In said annexed drawings:

Fig. 1 is a fragmentary end elevation of a clutch and brake unit employing my invention;

Fig. 2 is a section therethrough as indicated by the lines 2—2 on Fig. 1;

Fig. 3 shows details of, and connections in, the fluid system employed to energize the clutch;

Fig. 4 is a section through Fig. 3 as indicated by the lines 4—4 thereon;

Fig. 5 is a wiring diagram for the torque motor and magnetic brake.

Figure 6:
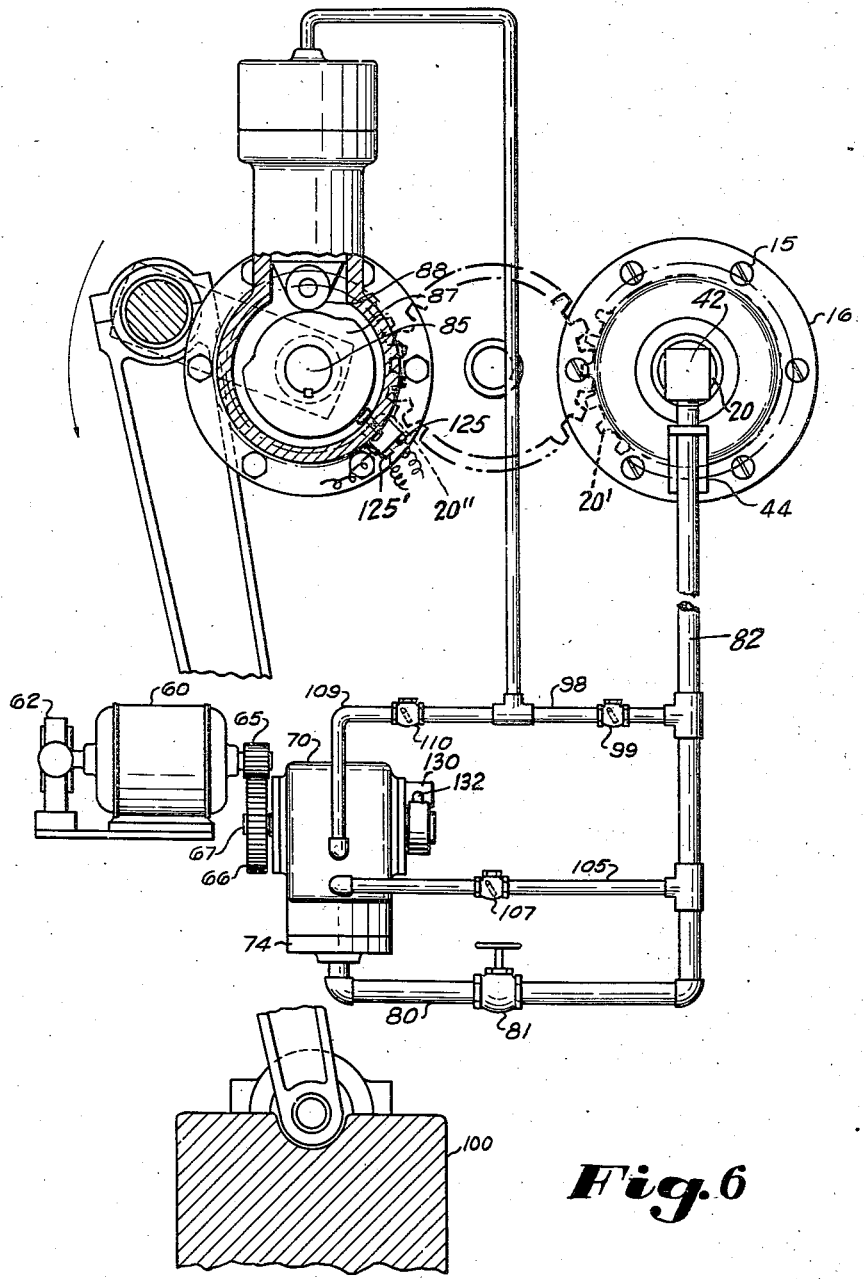
Fig. 6 is a fragmentary partially sectional view showing the relationship of the various parts.

Referring now to Figs. 1 and 2, there is shown at 10 a frame plate of a machine utilizing my invention. Bolted to the plate at 12 are brackets 14 which support the brake unit, and bolted to the plate at 15 is a removable bearing unit 16 which supports one end of the driven shaft. The other end is suitably supported at another point in the machine. This removable bearing comprises a cup 16 with an inner face which receives the outer races of tapered roller bearings 17. The inner races of the bearings are secured to the driven shaft 20. Suitable packing is provided to retain lubricant in effective relation to the bearings.

A flywheel 22 is idly carried on the shaft 20 by tapered roller bearings 23. The outer periphery of the flywheel is grooved at 24 to receive a series of V-belts by which power from a prime mover is transmitted to the flywheel.

Keyed to the shaft at 25 is a hub 26 which supports the driven brake and clutch units. The clutch plates are slidably mounted to be held between a hub flange 28 bolted to the hub at 29 and a plate 30, which is slidably mounted on the hub 26. The brake plates in turn are held between the ring 30 and a flange 32 which is threadingly carried at 33 by the hub 26. The flange may be rotated to move axially of the shaft and thus to provide adjustment for wear of the linings. When in an adjusted position the hub and flange 32 are fixed with respect to each other by a removable key 34.

To engage the clutch, fluid pressure is employed to move the plate 30 toward the right (Fig. 2). To this end, four cylinders 35 are formed in the hub and receive respective pistons 37 which bear against pins 38 interposed between the pistons and the plate 30. Caps 39 seal the cylinders and provide access thereto. The pins and pistons are normally maintained lightly against the plate 30 by compression springs 40 interposed between the caps and pistons, respectively.

Fluid under pressure, as hereafter described, is supplied to the cylinders through an end connection 42. This end connection as shown in Fig. 2 is of the conventional type and the non-rotative portion is rigidly secured at 44 to the bearing cap 16. Connection 42 leads to an axial bore 45, passing through the shaft 20 and terminating adjacent passages leading therefrom to each of the four cylinders, respectively. Thus as fluid, preferably oil, under pressure, is supplied behind the pistons, the plate 30 is moved to the right (Fig. 2) to hold the clutch plates carried by the hub in driving engagement with a clutch plate 47 slidingly carried by the flywheel on pins 48.

To apply the brake and release the clutch, four loaded springs are provided which shift the plate 30 toward the left (Fig. 2). These springs, indicated at 50, are held between the hub 26 and bushings 51 carried by studs 52. The studs in turn are provided with heads carried in the plate 30.

As the fluid pressure behind the pistons 37 is released, the springs 50 expand and pull the plate 30 to the left (Fig. 2) to grip the brake plates carried by the hub in braking engagement with a brake member 55 slidingly carried by the brackets 14 on pins 56.

The fluid system by which the clutch and brake are actuated is best shown in Figs. 3 and 4. To energize this system a torque motor 60 of characteristics already defined, carrying as an integral part therewith a magnetic brake 62, functions to drive a shaft 64 carrying a drive pinion 65. This pinion in turn engages with a gear 66 mounted on a shaft 67 carried by ball bearings in a housing 70. The shaft carries a cam 71, keyed thereto at 72, which reciprocates a pump piston 73. The piston 73 is carried in a cylinder 74 which is removably secured at 75 to the housing 70. A relatively light compression spring 77 holds the piston in an upper position, as best shown in Fig. 3.

As the torque motor is rotated the piston is depressed until pressure is established in the system sufficient to stall the motor. The motor remains stalled during the operative cycle until it is reversed and returns to its initial position.

The initial pressure thus established is carried from the cylinder 74 through piping 80 past a shut-off valve 81 through a pipe 82 into the connection 42 leading to the pistons of the clutch and brake unit. This initial pressure engages the clutch with sufficient force to begin the operation of the machine with which my invention is used. Included in this machine is the mechanism for applying the second stage of pressure to the system.

A crank shaft 85 or similar driven element of the machine is suitably driven by the driven shaft 20 and operates the second stage fluid mechanism, as best shown in Figs. 3 and 6. Here such a shaft carries a cam 87 which is engaged by a follower 88 mounted in a piston comprising parts 90 and 91. These two parts are normally separated to the extent allowed by a bolt 92 through the action of a loaded compression spring 95. The spring is calibrated to compress at a predetermined pressure which will be the desired safe operating pressure of the system. Thus, if the positive action parts of the invention act to build up a pressure exceeding a safe limit, the part 91 of the piston will stand idle while the part 90 will be driven and the spring 95 compressed. The part 91 of this piston unit is formed at 96 to traverse a cylinder 97 to apply the second stage of pressure through piping 98 and a check valve 99 to the pipe 82. The piston unit is normally held against the cam 87 by a light spring 89.

In operation, the dual pressure mechanism just described functions as follows. When the controlling switch 120 is depressed, the torque motor rotates, shifting the cam 71 to depress the piston 73 and apply a first stage of oil pressure behind the pistons 37, which engages the clutch. This pressure is sufficient to apply the clutch with sufficient force to actuate the shaft 20 and through suitable connections such as the gearing 20' and 20" actuate the die slide 100 and can be adjusted within wide limits. As the machine is turned over, a movable part, such as the crank shaft 85, actuates the composite piston unit 90, 91 through the cam 87 to apply a second pressure higher than the first behind the pistons 37, which results in the application of the full operating pressure behind the clutch plates during the working stroke of the machine. Thus, the first application of pressure moves a relatively large volume of oil to shift the clutch plates into engagement while the second application of pressure acts to increase the plate pressure with practically no further movement of the plates. The first stage oil pressure established by the motor 60 and piston 73 is effective upon the pistons 37 between and after the application of said first stage oil pressure to the clutch device and the application of said second or increased pressure, which second or increased pressure is established by the driving means above referred to and the composite piston unit 90, 91.

The system is replenished with oil during each stroke of the pump. Each time the piston 73 is released to rise it reduces the oil pressure in the adjacent part of the system because the pipe friction and oil viscosity retard the return flow of oil from the clutch. This drop in pressure draws oil into the system from the housing 70 through piping 105 and past a check valve 107. The valve acts as a seal when the system pressure is again built up. It thus follows that more oil will be drawn into the system than its normal capacity allows. As the brake springs 50 decrease this capacity the excess flows back into the housing through a port 108 in cylinder 74 which is exposed when the piston has moved to the position of Fig. 3. On its down stroke the piston seals the port.

Small quantities of oil must be added from time to time to the high pressure cylinder 97. This is accomplished through piping 109 connecting the housing and the piping through a check valve 110. Normally the valve 110 is held closed. However, as the amount of oil in the cylinder 97 drops below the required amount the suction created opens the valve 110 and draws oil into the cylinder 97.

The torque motor and magnetic brake are controlled as indicated by the wiring diagram of Fig. 5. Here a three-phase source of power is supplied to the connections at 115. This current is applied to the motor 60 and to the brake 62 through a forward switch 117 or a reversing switch 118 by means of relay magnets 117' and 118', respectively, which serve to close said switches in the usual manner. The switches 117 and 118 are electrically controlled from the main source of current by means of relays 117' and 118'. As the normally open, main control switch 120 is closed, the current flows through the circuit and through a normally closed switch 125 to be hereinafter described, and energizes the relay 117' thus closing the forward switch 117 to drive the torque motor 60 and apply the first stage of pressure to the clutch. After the clutch has been engaged, the workman releases the switch 120. This breaks the supply of current through the forward switch 117 to the motor 60 and brake 62, thus setting the brake 62 to hold the motor 60 in clutch-engaged position and removing the stalling load from the motor 60. When it is desired to release the clutch, a manual switch 121 may be thrown, which causes the current to pass through the relay 118', thus closing the reversing switch 118 and at the same time opening the circuit through relay 117' of the forward switch 117, if such switch should be closed. The switch 121 functions solely as an emergency stop switch since if the machine is intermittently run its operation is controlled by the switch 125 and by a switch 125', both of which are to be hereinafter described.

The motor 60 is normally reversed and the clutch released by switches 125 and 125' mounted on the machine. It will be noted upon an examination of Figs. 3 and 6 on the accompanying drawings that the switches 125 and 125' are preferably mounted on the crank case of the second stage fluid mechanism hereinbefore described and the spring-pressed plunger of said switches is in engagement with the high and low portions of the cam 87, the high portion of said cam having a relatively long circumferential extent whereas the low portion of said cam is of relatively short circumferential extent. The switch 125 is opened when the low portion of cam 87 permits and is closed when the high portion of cam 87 depresses the spring-pressed plunger of said switch during rotation of said cam. The switch 125 is normally closed, i. e., said switch is closed during the entire time that the spring-pressed plunger of said switch is in engagement with the relatively long high portion of cam 87, and is suitably connected to a normally open switch 125' in the circuit from the source of current to the relay 118' of the reversing switch 118, so that as the switch 125 opens when the plunger thereof rides on the relatively short low portion of cam 87, the switch 125' is closed and switch 125 is opened, thereby breaking the circuit to the relay 117' of the forward switch 117 and completing the circuit to the relay 118' of the reversing switch 118. Interlocking switches such as 125 and 125' in which a spring-pressed plunger is moved between spaced pairs of contacts, are quite old in the art of circuit makers and breakers and the details thereof form no part of applicant's present invention. Interlocking switches of this general type are adequately disclosed in such patents as 2,225,007, 2,221,216 and 2,165,809. In view of the fact that such interlocking switches are old and well known, further illustration is not believed to be necessary since their manner of operation will be obvious to one skilled in the art. A line switch 127 is provided which, when open, renders the switches 125 and 125' inactive and results in continuous clutch engagement. When the line switch 127 is closed, the circuit is then set up to disengage the clutch each time the switches 125 and 125' are actuated.

The switches 125 and 125' will be closed and opened before the parts of the machine finally come to rest due to the inertia and momentum of the machine parts. In this connection it will be noted that when the plunger of the switch 125 is released by riding on to the relatively short low portion of the cam 87, switch 125' will be closed to reverse the motor 60 to relieve the pressure on pistons 37 by relieving pressure on the piston 73 and to permit the springs 50 to disengage the clutch. At that time the roller 88 still engages the high portion of the cam 87, thereby maintaining piston 96 in its elevated position. While the power applied to the shaft 85 and the cam 87 would then cease, the inertia and momentum of the machine parts will effect a sufficient continued rotation of the shaft 85 and cam 87 to cause the high portion of the cam 87 to ride against the switch plunger and the low portion of the cam 87 to engage the roller 88 thus permitting the piston 96 to be lowered. Hence, the switch 125 will again be closed and the switch 125' will be opened and these switches returned to their normal operating positions, i. e., switch 125 is closed and switch 125' is opened so that further actuation of the main control switch 120 will close the circuit through the relay 117' of forward switch 117 when it is again desired to engage the clutch for further machine operation. If, however, the switch 125' is not opened by cam 87 before the machine stops, a limit switch 130 will function to open the reversing circuit. This switch 130 is mounted on the housing 70 in position to be engaged by an arm 132 carried on the shaft 67. Thus when the motor backs the shaft 67 enough to allow the piston 73 to assume the position of Fig. 3 the arm 132 opens the switch 130, which switch in turn causes the reversing switch 118 to open.

From the foregoing description it will be seen that I have provided a novel control system for machine tools and the like which is adapted for a wide variety of uses and presents marked advantages over constructions heretofore used.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. In a clutch apparatus of the class described for coupling a machine to a source of power, a clutch device interposed between the machine and the source of power, fluid pressure means to actuate said clutch, a device to apply pressure to said pressure means, an electric motor to operate said device and to stall at a predetermined point in the application of pressure, and means automatically operable to hold said electric motor against movement when the motor is acting to hold said clutch engaged.

2. In a clutch apparatus of the class described for coupling a machine to a source of power, a clutch device interposed between the machine and the source of power, fluid pressure means to actuate said clutch, a device to apply pressure to said pressure means, an electric motor to operate said device and to stall at a predetermined point in the application of pressure, and means automatically operable to hold said electric motor against movement when said motor is acting to hold said clutch engaged, a switch carried by the machine and adapted to be closed at a predetermined point in the machine operation, and means operative by said switch to reverse said motor to disengage said clutch.

3. In a clutch apparatus of the class described for coupling a machine to a source of power, a clutch device interposed between the machine and the source of power, means to actuate said clutch device by applying an operating pressure thereto in two stages, power means to apply the first stage of operating pressure to said clutch to initiate a drive to said machine, a second means operative after said drive is initiated to apply the second stage of operating pressure to said clutch, and means to hold said power means against further movement when said power means is acting to hold said clutch engaged.

4. In a clutch apparatus of the class described for coupling a machine to a source of power, a clutch device interposed between the machine and the source of power, means including a first pump unit and a second pump unit to successively apply fluid pressures to said clutch device to actuate the same, power means to operate said first pump unit to apply an initial pressure to said clutch device sufficient to begin operation of the machine, a driving member to operate said second pump unit to apply an increased operating pressure to said clutch device, and means to hold said power means and first pump unit in pressure-maintaining position between and after the application of said initial pressure to said clutch device and the application of said increased operating pressure to said clutch device.

5. In a clutch apparatus of the class described for coupling a machine to a source of power, a clutch device interposed between the machine and the source of power, means including two pump units to apply fluid pressure to said clutch device to actuate the same, a reversible electric motor to operate one pump unit to apply an initial pressure to said clutch device sufficient to begin operation of the machine, a driving member to operate the other pump unit to apply an increased operating pressure to said clutch, and means to reverse said motor to release said one pump and release the fluid pressure to said clutch.

6. In a clutch apparatus of the class described for coupling a machine to a source of power, a clutch device interposed between the machine and the source of power, means including two pump units to apply fluid pressure to said clutch device to actuate the same, a reversible electric motor to operate one pump unit to apply an initial pressure to said clutch device sufficient to begin operation of the machine, a driving member to operate the other pump unit to apply an increased operating pressure to said clutch, a switch adapted to be actuated at a predetermined point in the operation of said machine, and means controlled by the operation of said switch to reverse said motor to release said one pump and release the fluid pressure to said clutch.

7. In a clutch apparatus of the class described for coupling a machine to a source of power, a clutch device interposed between the machine and the source of power, means including two pump units to apply fluid pressure to said clutch device to actuate the same, power means to operate one pump unit to apply an initial pressure to said clutch device sufficient to begin operation of the machine, a driving member operated by said machine to operate the other pump unit to apply an increased operating pressure to said clutch, and yieldable means in one of said two pumps operable to yield after the back pressure therein has reached a predetermined amount.

8. In a clutch and brake apparatus of the class described for alternately coupling a machine to a source of power or to a brake, a clutch device, a brake device, means normally tending to apply said brake device to hold said machine stationary, fluid means to simultaneously actuate said clutch device, and release said brake, pumps to apply operating pressure to said fluid means in two stages, means for holding one of said pumps, and means for limiting the pressure created by one of said pumps.

9. In a clutch apparatus of the class described for coupling a machine to a source of power, a clutch device interposed between the machine and the source of power, fluid operated means to actuate said clutch device, and pressure establishing means to apply pressure to said fluid operated means in two stages, said last named means including means for limiting the pressure of one of said stages.

10. In a clutch apparatus of the class described for coupling a machine to a source of power, a clutch device interposed between the machine and the source of power, means including two pump units to apply fluid pressure to said clutch device to actuate the same, power means to operate one pump unit to apply an initial pressure to said clutch device sufficient to begin operation of the machine and including means for holding said pump unit, and a member driven by the machine to operate the other pump unit to apply an increased operating pressure to said clutch.

11. In a clutch apparatus of the class described for coupling a machine to a source of power, a clutch device interposed between the machine and the source of power, means including two pump units to apply fluid pressure to said clutch device to actuate the same, power means to operate one pump unit to apply an initial pressure to said clutch device, a driven member operated by said machine to operate the other pump unit to apply an increased operating pressure to said clutch device, and means for limiting the pressure output of said other pump unit.

LARKIN R. WILLIAMSON.